United States Patent [19]

Packer

[11] Patent Number: 5,802,106

[45] Date of Patent: Sep. 1, 1998

[54] METHOD FOR RAPID DATA RATE DETECTION IN A PACKET COMMUNICATION ENVIRONMENT WITHOUT DATA RATE SUPERVISION

[75] Inventor: Robert L. Packer, Los Gatos, Calif.

[73] Assignee: Packeteer, Inc., Cupertino, Calif.

[21] Appl. No.: 762,828

[22] Filed: Dec. 6, 1996

[51] Int. Cl.$^6$ .............................. H04B 3/46; H04B 17/00; H04Q 1/20

[52] U.S. Cl. ..................... 375/225; 370/229; 370/230; 370/233; 370/253

[58] Field of Search ........................ 375/225; 370/229, 370/233, 234, 235, 236, 253

[56] References Cited

U.S. PATENT DOCUMENTS

4,887,280  12/1989  Reisenfeld ............................ 375/121
4,912,765  3/1990  Virupaksha ............................ 381/31
5,072,407  12/1991  Gutz et al. ............................ 364/514
5,301,303  4/1994  Abraham et al. ...................... 395/500
5,440,298  8/1995  Kuramatsu ........................... 340/825.44
5,689,511  11/1997  Shimazaki et al. .................... 370/545

*Primary Examiner*—Stephen Chin
*Assistant Examiner*—Mohammad Ghayour
*Attorney, Agent, or Firm*—Townsend and Townsend and Crew LLP; Kenneth R. Allen

[57] ABSTRACT

A method for data flow rate detection useful with data flow rate control is introduced into a TCP packet communication environment which does not have data rate supervision by computing presumed speed based on latency between packets during the initial interchange of synchronization (SYN) packet and the acknowledgement (ACK) packet, presuming to know the initial length of each. This information may be utilized to determine potential rate of data flow for further use in making bandwidth allocation and rate enforcement decisions.

8 Claims, 3 Drawing Sheets

METHOD FOR RAPID DATA RATE DETECTION IN A PACKET COMMUNICATION ENVIRONMENT WITHOUT DATA RATE SUPERVISION

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

This invention relates to digital packet telecommunications, and particularly to data flow rate detection. It is particularly useful in conjunction with data flow rate control at a particular layer of a digitally-switched packet telecommunications environment normally not subject to data flow rate control wherein data packets are communicated at a variety of rates without supervision as to rate of data transfer, such as under the TCP/IP protocol suite.

The widely-used TCP/IP protocol suite, which implements the world-wide data communication network environment called the Internet and is employed in local networks also (Intranets), intentionally omits any explicit supervisory function over the rate of data transport over the various media which comprise the network. While there are certain perceived advantages, this characteristic has the consequence of juxtaposing very high-speed packet flows and very low-speed packet flows in potential conflict, which results in inefficiencies. Certain loading conditions can even cause instabilities which could lead to overloads that could stop data transfer temporarily. It is therefore considered desirable to provide some mechanism to optimize efficiency of data transfer while minimizing the risk of data loss. It is extremely useful to obtain an early indication of the rate of data flow which can or must be supported. In fact, a knowledge of data flow rate capacity is a key indicator for use in resource allocation decisions. For example, if a particular path is of inadequate capacity to handle a high rate of data flow, an alternative route may be sought out. To this end, some form of data flow rate detection is needed, preferably one which operates extremely fast, which operates on a packet flow as early as possible during a link up between nodes and which does not require a measurement on the substantive data to be communicated in order to determine the data flow rate.

In order to understand the exact context of the invention, an explanation of technical aspects of the Internet/Intranet telecommunications environment may prove helpful.

Internet/Intranet technology is based largely on the TCP/IP protocol suite, where IP is the network level Internet Protocol and TCP is the transport level Transmission Control Protocol. At the network level, IP provides a "datagram" delivery service. By contrast, TCP builds a transport level service on top of the datagram service to provide guaranteed, sequential delivery of a byte stream between two IP hosts.

TCP has flow control mechanisms operative at the end stations only to limit the rate at which a TCP endpoint will emit data, but it does not employ explicit data rate control. The basic flow control mechanism is a 'sliding window', a range of bytes beyond the last explicitly-acknowledged byte, which by its sliding operation essentially limits the amount of unacknowledged transmit data that a transmitter can emit.

Another flow control mechanism is a congestion window, which is a refinement of the sliding window scheme involving a conservative expansion to make use of the full, allowable window. A component of this mechanism is sometimes referred to as "slow start".

The sliding window flow control mechanism works in conjunction with the Retransmit Timeout Mechanism (RTO), which is a timeout to prompt a retransmission of unacknowledged data. The timeout length is based on a running average of the Round Trip Time (RTT) for acknowledgment receipt, i.e. if an acknowledgment is not received within (typically) the smoothed RTT+4*mean deviation, then packet loss is inferred and the data pending acknowledgment is retransmitted.

Data rate flow control mechanisms which are operative end-to-end without explicit data rate control draw a strong inference of congestion from packet loss (inferred, typically, by RTO). TCP end systems, for example, will 'back-off', i.e., inhibit transmission in increasing multiples of the base RTT average as a reaction to consecutive packet loss.

Bandwidth Management in TCP/IP Networks

Bandwidth management in TCP/IP networks is accomplished by a combination of TCP end systems and routers which queue packets and discard packets when some congestion threshold is exceeded. The discarded and therefore unacknowledged packet serves as a feedback mechanism to the TCP transmitter. (TCP end systems are clients or servers running the TCP transport protocol, typically as part of their operating system.)

The term "bandwidth management" is often used to refer to link level bandwidth management, e.g. multiple line support for Point to Point Protocol (PPP). Link level bandwidth management is essentially the process of keeping track of all traffic and deciding whether an additional dial line or ISDN channel should be opened or an extraneous one closed. The field of this invention is concerned with network level bandwidth management, i.e. policies to assign available bandwidth from a single logical link to network flows.

Routers support various queuing options. These options are generally intended to promote fairness and to provide a rough ability to partition and prioritize separate classes of traffic. Configuring these queuing options with any precision or without side effects is in fact very difficult, and in some cases, not possible. Seemingly simple things, such as the length of the queue, have a profound effect on traffic characteristics. Discarding packets as a feedback mechanism to TCP end systems may cause large, uneven delays perceptible to interactive users.

A mechanism is needed to measure packet flow rate in order to control packet traffic efficiently.

It is particularly challenging to deal with TCP protocols because TCP protocols ignore the fact that delay is proportional to packet size or data length. The load issue means that there is a need to distinguish between high speed serial links over long distances and low speed serial links over short distances. TCP protocols cannot distinguish these two situations.

SUMMARY OF THE INVENTION

According to the invention, in a packet communication environment in which there is no data rate supervision to control assignment of available bandwidth from a single logical link to network flows, such as an environment using TCP protocols, a method is provided for making an early estimate of actual data rate capacity of a path by monitoring the first useful packet level traffic and associating individual packets with the actual duration of transmission or of reception through determining the time difference $T_1$ between time of arrival of the first data packet and time of arrival of the acknowledgement ("ACK") packet of the immediately preceding connection establishment or synchronization ("SYN") packet, given knowledge of the number of bits "m" of data in the first data packet. The serialization speed estimate, which is the limiting data flow rate capacity of the end to end path of a given connection between nodes, is thus given by the relation:

$$SS=m/T_1 \text{ in bits per second.}$$

The invention allows the separation of the time variant and time invariant portions of transit delay. The ratio of packet size to serialization speed is the time variant portion of transit delay, and the latency is the time invariant portion. The techniques according to the invention can also be used to monitor and update the estimate of speed capacity during the course of transmission.

The invention has the advantage of being transparent to all other protocol entities in a TCP/IP network environment. For example, in the connections controlled according to the invention, it is transparent to TCP end systems (i.e., end systems using the TCP protocol). In other words, it does not involve injection of extra packets or the introduction of any latency. The invention also has the advantage of being able to establish a Serialization Speed estimate at the beginning of a connection, based on two independent latencies, a packet size-invariant latency plus a packet size-varying latency. It may be used as a basis for automatic switching among nodes.

The invention will be better understood upon reference to the following detailed description in connection with the accompanying drawings.

DETAILED DESCRIPTION OF SPECIFIC EMBODIMENTS

In a related patent application, a disclosure is made on specific control applications using automatic detection of speed of data transmitted through a packet communication system, such as one using the TCP protocol. The application, entitled, METHOD FOR EXPLICIT DATA RATE CONTROL IN A PACKET COMMUNICATION ENVIRONMENT WITHOUT DATA RATE SUPERVISION, Ser. No. 08/742,994, filed Nov. 1, 1996 in the name of Robert L. Packer, describes a technique for adjusting speed by adding latency to acknowledgement packets and by adjusting window size to control latency directly. The content of that application is incorporated herein by reference and made a part hereof.

The present invention is a specific mechanism for generating information on the speed of data upon which decisions can be made.

The packet network environment is modeled as a network with at least a remote access link with a finite serialization speed (SS) resulting in a transit delay (which is inversely proportional to the serialization speed). The balance of the network is presumed to be composed of much higher speed links resulting in a transit delay, herein called latency (LAT) which is effectively invariant of packet size. The measured transit delay is composed of both the time variant and the time invariant transit delay. The ratio of packet size to serialization speed is the time variant portion of transit delay, and the latency is the time invariant portion.

Figure 1:
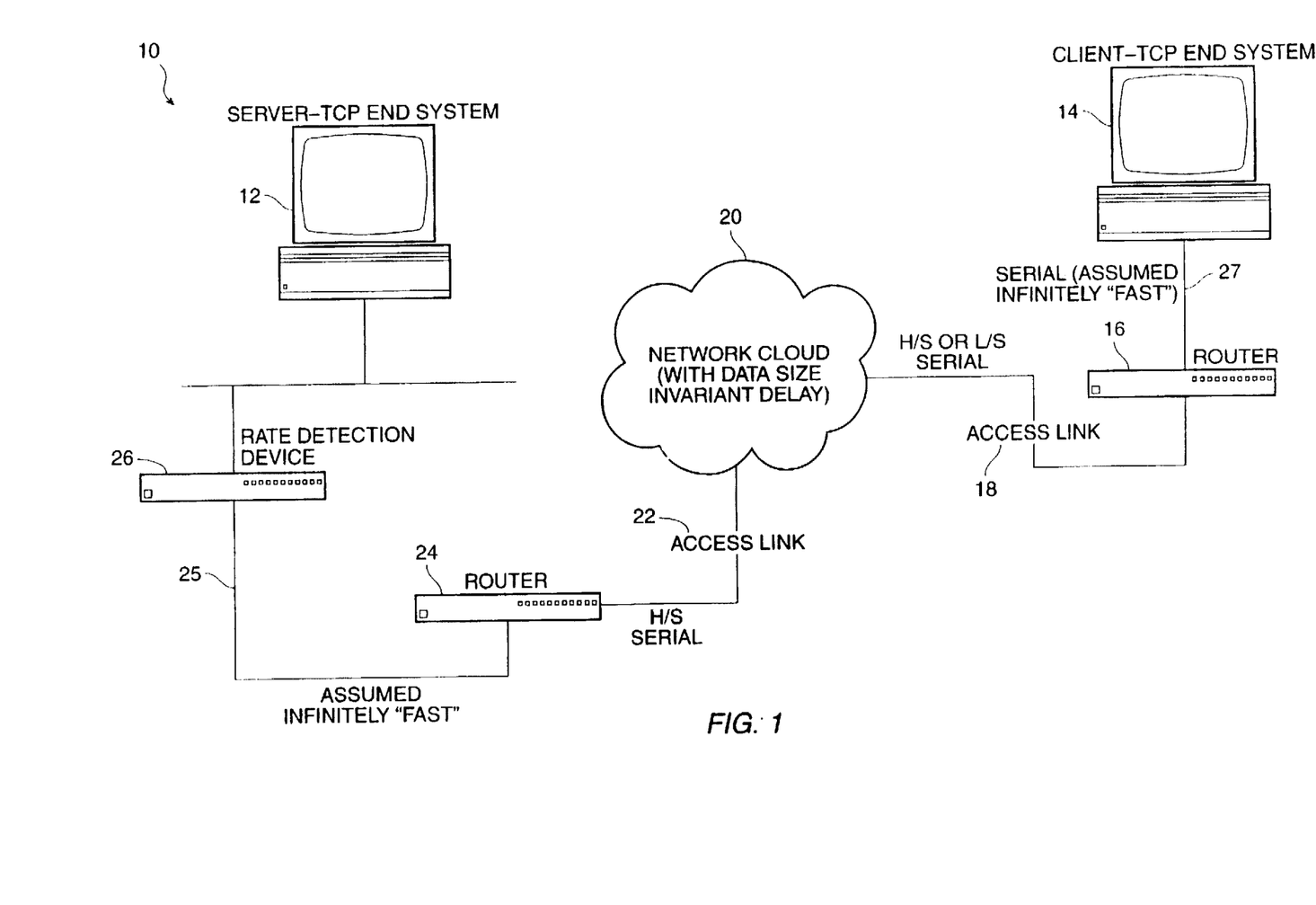
FIG. 1 is a block diagram of a system according to the invention.

Referring to FIG. 1, a system 10 according to the model which uses the invention comprises a first TCP end system 12, such as a server device, which may be local, a second TCP end system 14, such as a client device which may be considered remote, which is connected through a first data path 27 assumed to be infinitely fast to router 16 and thence via a first access link 18 into a network cloud 20 of a character as hereinafter explained, which in turn provides a logical connection via a second access link 22 to a second router 24. According to the invention, there is provided between at least one of the end systems 12 and one of the routers 24 (via a data path 25 assumed to be infinitely fast) a rate detection device 26 which is operative to detect the rate at which a TCP end system 14 can emit or accept packets via an access link 18 at the far side of a network cloud 20. The rate detection device 26 is preferably placed at the end system in data paths whose speeds are infinitely fast or otherwise known and discounted. A rate detection device 26 may be placed adjacent or in any system in a path for data. At the server, it is most effective in detecting flow rate because it typically receives and relays the bulk of the traffic of interest.

The rate detection mechanism may be incorporated conveniently into computer-executable code, assuming the end system or the router is programmable. The invention tests whether the first access link 18 is slower than the second access link 22, where there is no explicit information available at the rate detection device 26 about the speed of the first access link 18.

The network cloud 20 may contain any number of elements and paths between the access links. For the purpose of this model, the network cloud 20 is assumed to produce a delay which is effectively invariant with the size of the data over intervals of interest.

Figure 2:
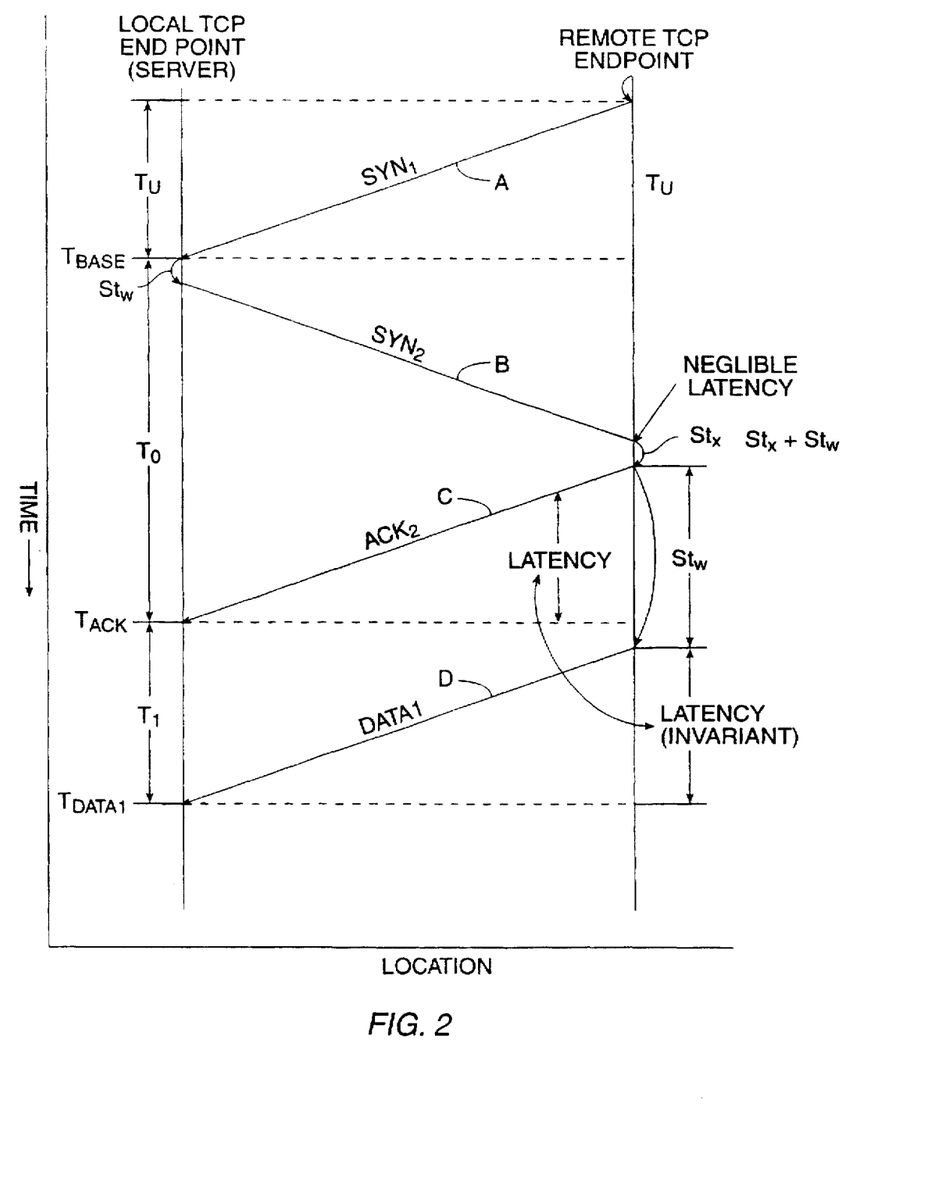
FIG. 2 is a two-dimensional timing diagram illustrating a first type of exchange of packets between TCP endpoints.

Referring to FIG. 2, there is shown a two-dimensional timing diagram illustrating an exchange of packets between TCP endpoints. According to the invention, the initial data packets are examined as they establish a connection from which variables are developed which can be utilized immediately to identify a maximum data rate. The serialization speed (SS) or data flow rate capacity of the link is given by the relation:

$$SS=m/T_1 \tag{1}$$

where m=number of bytes in the first data packet (DATA1)

$T_1$=The arrival time of the first data packet less the time of arrival of the ACK packet ($T_{DATA1}-T_{ACK}$), referenced to the immediately preceding SYN packet.

Referring to FIG. 2, a remote HTTP request for connection or first synchronization ($SYN_1$) packet (of known byte length) is issued by a remote TCP endpoint (client) to a local TCP endpoint (server) by a remote TCP endpoint (client) (Step A). This takes a finite (but irrelevant) amount of time to serialize for transmission through the cloud 20, and then takes a finite but unknown and invariant transit time ($T_u$) to arrive at the local TCP endpoint. The local TCP endpoint responds (assumed effectively immediately) by sending its own synchronization packet ($SYN_2$) (Step B) following a finite but known time $T_w$ for serialization of that packet at the local TCP endpoint. This SYN packet is of known byte length. It is issued (begins serialization) at a known time $T_{BASE}$, which becomes the reference time. The remote TCP endpoint issues, after a brief but assumed negligible latency, a standard acknowledgement packet $ACK_2$, responsive to the $SYN_2$ packet, whose length is likewise known. The time for serialization at the remote TCP endpoint is $T_x$, after which the $ACK_2$ packet is introduced into the network cloud (Step C). The time of arrival of the $ACK_2$ packet, after transit of the network cloud, is $T_{ACK}$. Immediately upon completion of serialization of the $ACK_2$ packet, the remote TCP server issues the first data packet DATA1 of length m, whereupon the remote TCP endpoint serializes the packet for a serialization time St(m) and then introduces the packet into the network cloud (Step D). It arrives at the local TCP endpoint at time $T_{DATA1}$. Time $T_1$ is computed immediately at the time of arrival of DATA1 by examining the difference in arrival time of the received $ACK_2$ packet and of the received DATA1 packet, i.e., $T_1=T_{DATA1}-T_{ACK}$. The value m can be extracted by examining the entire first packet DATA1 for length or by examining its packet length field, if any, in the header information of that packet.

The first estimate of serialization speed SS is given by Equation 1. The latency, that is, the time required to transit the network cloud, is assumed invariant for all packets for the period of interest. (Hence, the slopes of the "paths" between locations over time in FIG. 2 are the same. given this assumption, serialization speed, i.e., the variant time required at the remote TCP endpoint which is required to serialize the data into the packet for transmission, can be estimated as indicated in Equation 1 immediately upon interchange of these first packets. This value can then be used to make important strategic decisions about the nature and speed of the connection about to be established, and specifically it can be used to set the communication link parameters. This is a first order estimate. Subsequent refinements can be used to fine tune this initial allocation of resources.

As a second order estimate, for example, the serialization speed can be cross-checked by comparing the value obtained for serialization of n, the size (i.e., data length) of the SYN2 packet in response, plus the size (i.e., data length) of the $ACK_2$ packet. This is found by dividing the value n by the transit time $T_0$, or $$SS(\text{max possible})=n/T_0 \text{ in bits per second} \quad (2)$$

where n=number of bytes in the SYN packet plus the number of bytes in the ACK packet and $T_0$=the arrival time TACK of the ACK packet less the time $T_{BASE}$.

Note that the serialization time for n bits $St_n$ is the serialization time for the $SYN_2$ packet $St_w$ plus the serialization time for the $ACK_2$ packet $St_x$. The round trip time $T_0$ minus the serialization time $St_n$ is the round trip latency $T_d$, upstream and downstream.

A number of interesting characteristics can be shown from a measure of latency. For example, if the round trip latency value is a negative value, it is an indication that the path is asymmetrical or at least is transiently asymmetrical. It is also an indicator of a very low latency, high-speed link, such as a condition where the remote host is on the same local area network.

The remote host speed and latency which are based on the first and second order estimates can, at the outset of a communication session, be stored locally for temporary reference and use. As more information is obtained, the speed and latency values can be updated. A third order estimate of the speed of inbound packets from a remote host, the value of primary interest, may be made by simply checking the interarrival rate of every packet, namely, by computing the number of bytes received per unit time. In that way the serial speed of the limiting link with the remote host can constantly be updated. And it should be understood that the values are only valid for the duration of a connection, since it is possible that the remote address may be reused by a network address translation device. Moreover, it should be understood that the serialization speed is readily separated from latency when there is a separation between the time of transmission of the ACK packet and the transmission of the first data packet.

Some variations on the method according to the invention are indicated, depending on the implementation scheme of the TCP protocol. Some implementations of the TCP protocol append the initial data to the third step of the connection handshake, so there is but one packet sent. (In other words, Step C, FIG. 2, and Step D, FIG. 2, are one unit for transmission purposes.) While it is possible to determine speed of a round trip made by a known number of bytes in both directions, there is no way of separating serialization speed from a measure of network latency, since there is no mechanism for measuring latency at the beginning of such a connection.

To estimate the respective contributions of latency and serialization speed in this case, the following technique is used to establish the time attributable to latency alone. Assume at first zero latency, then calculate the serialization speed according the established technique. With the calculated speed, "sanitize" the speed, that is, assign the speed of communication to the next lower standard speed (which assumes that there are a finite number of standard speeds). Then calculate the latency for that lower speed and use that latency for subsequent speed estimates.

This assignment of speed at the highest serialization speed SS can then be used with the third order check, described above, to correct the serialization speed (SS), assuming this latency.

Figure 3:
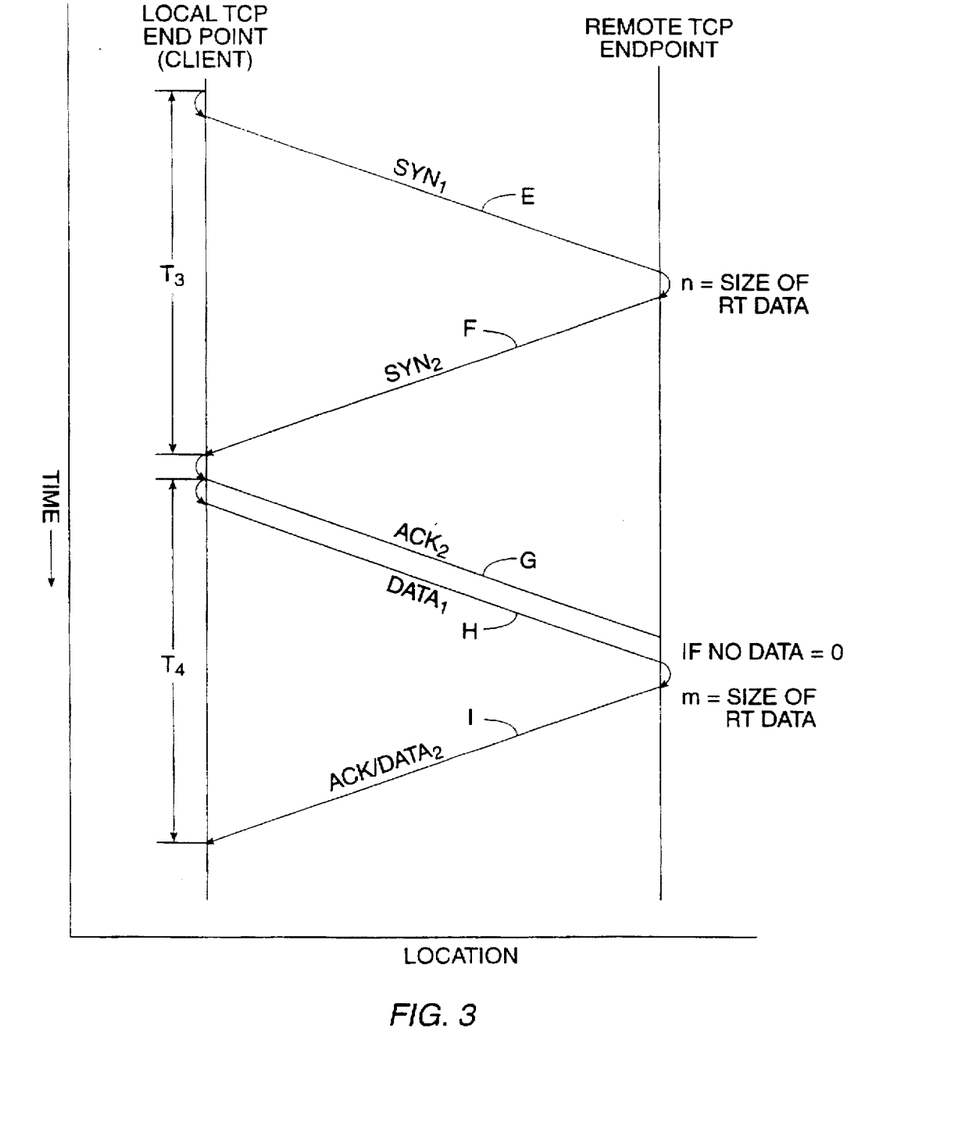
FIG. 3 is a two-dimensional timing diagram illustrating a second type of exchange of packets between TCP endpoints.

There is a variation on the HTTP request protocol which gives a local system still further information for making the initial speed estimate. Referring to FIG. 3, assume the local TCP endpoint is the client and the remote TCP endpoint is the server, so that the client issues an outbound HTTP request $SYN_1$ at a known time (Step E) causing the remote TCP endpoint to issue its synchronization packet $SYN_2$ (Step F). The $ACK_2$ follows (Step G), which in turn is followed by an outbound DATA1 packet (Step H), which prompts a return of an $ACK_3$ possibly piggy backed by a DATA2 packet. The length of time between issuance and arrival of the connection packets $T_3$ is known, as is the packet size, and the duration between the time of issuance and arrival of the data packets $T_3$ is known. There is effectively a second round trip of the first outbound packet and the first inbound packet from which serialization speed can be estimated.

The two round trips have differing amounts of data. By assuming constant latency over a very short interval, or at least that latency changes only very slowly over short time intervals, the serialization time can be estimated as follows:

$$St(n)+LAT=T_3 \quad (3)$$

$$St(m)+LAT=T_4 \quad (4)$$

where LAT is latency, a constant for each path. The resultant Serialization time $St_{m-n}$ is thus given by:

$$St_{m-n}=St(m)-St(n)=T_2-T_1 \quad (5)$$

Knowledge of the serialization speed, which is readily extracted from the serialization speed may be used with control mechanisms to make automatic decisions about network resource allocation, such as the scaling of bandwidth assignments for individual connections and thus improving network utilization efficiency.

The following is a detailed description of a specific embodiment of a rate detection mechanism expressed in pseudo-code. For example, the pseudo-code explains a mechanism of generating acknowledgements, including substituting acknowledgements. This pseudo-code also addresses specifics of the TCP environment. It should be noted that latency and the sliding window flow control can be implemented anywhere in the data path.

```
/**********************************************************
*
* TCP Speed Detection (PseudoCode)
*
**********************************************************
*/
Note TCB is a transport control block, i.e. the state information for a specific connection.
/**********************************************************
*
* Inbound detection. t0 is time from synrsp sent to ack rcvd. n is
* number of bytes in cumulative synrsp and first ack. t1 is time from
* t0 till first data received. m is size in bytes of first data.
*
* This method is for INBOUND HTTP, i.e. an app where remote client ACK
* to response syn is followed immediately by data, e.g. HTTP get.
*
* serialization function = s()
*
* we get s(n) + rtt = t0 and s(m) = t1.
*
* So we conclude that the speed is m/t1. Verify this by ensuring that
* at that speed, s(n) < (t0 - a reasonable minimum latency).
* Derive the one way latency in this fashion.
*
* If the derived latency is negative, an asymmetric connection may be
* indicated.
/**********************************************************
*
* tcpSpeedThirdCheck(tcb, bps)
*
* This function is called as a continuous check on the derived speed after
* the initial derivation. It checks to see if the actual speed inferred
* from the receipt of back to back data is in fact greater than the derived
* speed. If so, the new speed is returned (so the connection and host
* information can be updated)
*
* As noted, for asymmetric networks, we may in fact determine the
* higher speed path here.
**********************************************************/
*/ int tcpSpeedThirdCheck(TCB *tcb, SPEED lastAvgBps)
{
    SPEED speed;
    set speed to current detected speed
    if (lastAvgBps < speed)
        the inferred speed here is NOT greater than the
        detected speed, so return FALSE
    /*
    * OK - we have inferred a higher rate...
    */
    set the new detected speed to a sanitized lastAvgBps
    update the connection info
    return TRUE to indicate that the derived speed is changed
}
/**********************************************************
*
* tcpSpeedCaclcInbound()
*
* This function does the speed derivation given n, m, t0, and t1.
*
* speed = m/t1. time to serialize N must be Less than t0 - min latency.
**********************************************************
*/
#define MIN_RTT_LATENCY     4
#define OS_LATENCY          1
void tcpSpeedCalcInbound(TCB *tcb, n, m, t1, t0)
```

```
{
    int t, b, bps, minRttLatency;
    (Subtract local link serialization time for N bytes from )
    (t0 and for m bytes from t1           )
    /*
     * Find serialization time for m bytes in bits per second
     */
    bps = (m * 1000 * 8)/t1
    /*
     * Crosscheck against rtt + s(n) = t0 and find one way latency.
     */
    /*
     * Nbits * 1000 / bps
     */
    t = (n * 1000 * 8)/bps;
    /*
     * Set a reasonable minimum rtt latency.
     */
    * If we out of this range,
     * make a second order estimate based on
     * the initial n/t0...
     */
    if (t > (t0 - minimumRttLatency)){
        b = n << 13;
        bps = b/t0;
    }
    sanitize bps
    latency = (t0-t) >> 1;      /* figure one way latency */
    if latency is negative, path may be asymmetric. use third order
    check to finalize estimate
}
/**********************************************************
 *
 * tcpSpeedDetect(tcb, bcb, tcpHdr)
 *
 * Called for each TCP segment except the initial SYN. Set, for each
 * connection, the variables
 *
 * tbase, t1, t0, m, and n
 **********************************************************
 */ void tcpSpeedDetect(connection info, packet, TCP_HDR *tcpHdr)
{
    If it is already detected return;
    if (tcb->flags & TF_OUTBOUND){
    call outbound connection speed detection routine and
        return...
    }
    /*
     * Inbound Connection
     */
    if packet is inbound...
        if (SYN flag set in hdr) {
            tbase = now;
            n = packet length, including protocol headers
            t0 = 0;
        }
        else {
            unexpected packet or connection retry
        }
    }
    /*
     * Outbound packet...
     */
    else if packet is outbound {
    /*
     * Its either first ACK or a retry. Note we do not see the
     * original SYN here...
     */
    if (SYN set in tcp flags) {
            /*
             * Can't be sure on retry...
             */
            note failure here and wait for third order check...
        }
        else if (ACK set in tcp flags AND t0 == 0) {
            /*
             * See if Data is piggybacked on first ACK...
             */
            if (tcpHdr data length != 0) {
                tcpSpeedPiggyBack()
```

```
        return;
    }
    n += bcb->dataLen;
    t0 = now - tbase;
}
else {
    /*
     * No ACK or SYN in tcp flags
     */
    if (tcp data length == 0 or seq is not first
        packet sequence) {
            report failure and wait for third order check
    }
    m = packet data length;
    t1 = (now - tbase) - t0);
    tcpSpeedCalcInbound(tcb, n, m, t1, t0);
    }
  }
}
Copyright © Packeteer, Inc. 1996
***************************************************
```

The invention has now been explained with reference to specific embodiments. Other embodiments will be apparent to one of ordinary skill in the art. It is therefore not intended that this invention be limited, except as indicated by the appended claims.

What is claimed is:

1. A method for detecting data rate of data packets in a digital data packet communication environment having a plurality of digital packet transmission stations interconnectable in a data path, wherein said data packet communication environment employs the Transmission Control Protocol (TCP), wherein said data packet communication environment lacks explicit end-to-end data rate control, said method comprising the steps of:

causing a first digital packet transmission station at a remote first end to send a first synchronization packet to a second digital packet transmission station at a local second end in the regular course of requesting that a connection be established;

causing said second digital packet transmission station to send a second synchronization packet of known data length to said first digital packet transmission station at said second end in the regular course of establishing a connection;

waiting at said second digital packet transmission station for an acknowledgement packet;

noting time of arrival of said acknowledgement packet;

waiting at said second digital packet transmission station for receipt of a first data packet;

noting time of arrival of said first data packet and data length of said first data packet; thereafter determining an initial estimate of serialization speed by dividing the data length of the first data packet by the difference in time of arrival of said acknowledgement packet and time of arrival of said first data packet; and recording said initial estimate of serialization speed for further use.

2. A method for detecting data rate of data packets in a digital data packet communication environment having a plurality of digital packet transmission stations interconnectable in a data path, wherein said data packet communication environment employs the Transmission Control Protocol (TCP), wherein said data packet communication environment lacks explicit end-to-end data rate control, said method comprising the steps of:

causing a first digital packet transmission station at a remote first end to send a first synchronization packet to a second digital packet transmission station at a local second end in the regular course of requesting that a connection be established;

causing said second digital packet transmission station to send a second synchronization packet of known data length to said first digital packet transmission station at said second end in the regular course of establishing a connection;

waiting at said second digital packet transmission station for an acknowledgement packet;

noting time of arrival of said acknowledgement packet;

waiting at said second digital packet transmission station for receipt of a first data packet;

noting time of arrival of said first data packet and data length of said first data packet;

timing from the sending of said second synchronization packet;

determining a lower limit on serialization speed by dividing the sum of the data length of the synchronization packet and said acknowledgement packet by the time of arrival of said acknowledgement packet relative to the time of sending said second synchronization packet; and recording said lower limit on serialization speed for further use.

3. The method according to claim 2 further including:

thereafter refining estimates of serialization speed by measuring amounts of data which are actually received per unit time.

4. The method according to claim 1 further including separating estimates of latency from estimates of serialization speed; and recording said estimates of latency along with said estimates of serialization speed.

5. A method for detecting data rate of data packets in a digital data packet communication environment having a plurality of digital packet transmission stations interconnectable in a data path, wherein said data packet communication environment employs the Transmission Control Protocol (TCP), wherein said data packet communication environment lacks explicit end-to-end data rate control, and wherein said acknowledgement packet is inseparable from said first data packet said method comprising the steps of:

causing a first digital packet transmission station at a remote first end to send a first synchronization packet to a second digital packet transmission station at a local second end in the regular course of requesting that a connection be established;

causing said second digital packet transmission station to send a second synchronization packet of known data length to said first digital packet transmission station at said second end in the regular course of establishing a connection;

waiting at said second digital packet transmission station for an acknowledgement packet;

noting time of arrival of said acknowledgement packet;

waiting at said second digital packet transmission station for receipt of a first data packet;

noting time of arrival of said first data packet and data length of said first data packet; thereafter estimating latency by:
  first assuming zero latency;
  calculating said serialization speed given an assumption of zero latency; thereafter
  sanitizing said serialization speed to a lower speed; and thereafter
  recalculating said serialization speed given an assumption of latency at said lower speed; and thereafter recording said estimates of latency along with said estimates of serialization speed.

6. The method according to claim 5 further including:

thereafter refining estimates of serialization speed by measuring amounts of data which is actually received per unit time.

7. A method for controlling data rate of data packets in a digital data packet communication environment having a plurality of digital packet transmission stations interconnectable in a data path, wherein said data packet communication environment lacks explicit end-to-end data rate control and wherein said data packet communication environment employs the Transmission Control Protocol (TCP), said method comprising the steps of:

causing a second digital packet transmission station at a local second end to initiate a first synchronization packet of known data length to request a connection to a first digital data packet transmission station at a remote first end in the regular course of requesting that a connection be established, while initiating timing from said request; thereby causing said first digital packet transmission station at said remote first end to send a second synchronization packet of known data length to said second digital packet transmission station at said local second end in the regular course of establishing a connection;

causing said second digital packet transmission station to send an acknowledgement packet of known data length to said first digital packet transmission station at said second end while logging timing of each transmission and reception event;

causing said second digital packet transmission station to send a first data packet of known data length to said first digital packet transmission station at said second end;

waiting at said second digital packet transmission station for at least an acknowledgement and any data in a return packet;

noting time of arrival and size of said return packet; thereafter determining an initial estimate of serialization speed plus the invariant portion of round trip transit time by dividing the data length of the first data packet plus said return packet by their round trip transit time;

determining a second estimate of serialization speed plus said invariant portion of said round trip transit time by comparing with an estimate of serialization speed derived from round trip transit time of said first synchronization packet and said second synchronization packet, given known data length of said first synchronization packet and said second synchronization packet; and comparing said initial estimate with said second estimate to remove effects of said time invariant round trip transit time (invariant latency) in order to obtain the serialization speed; and recording said serialization speed for further use.

8. The method according to claim 7 further including:

thereafter refining estimates of serialization speed by measuring amounts of data which are actually received per unit time.

\* \* \* \* \*